J. W. BROWN & E. J. KEITHLY.
SWEEP RAKE.
APPLICATION FILED FEB. 4, 1909.
931,675.
Patented Aug. 17, 1909.
2 SHEETS—SHEET 2.
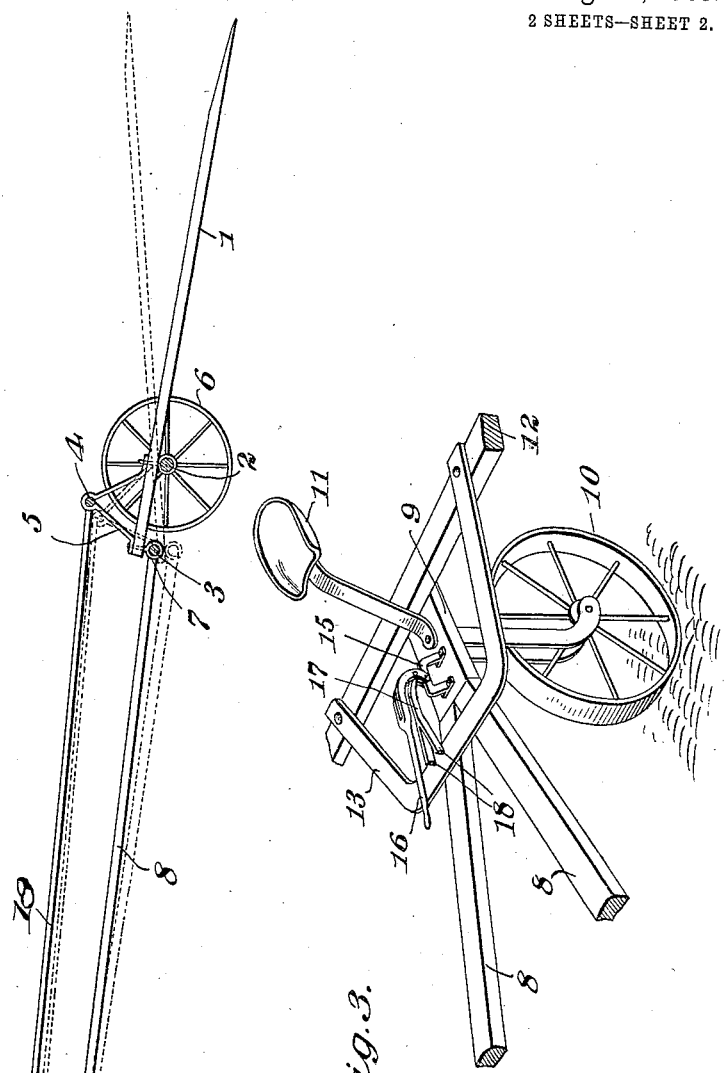
Witnesses
Inventors
J. W. Brown,
E. J. Keithly,
By
Attorneys.

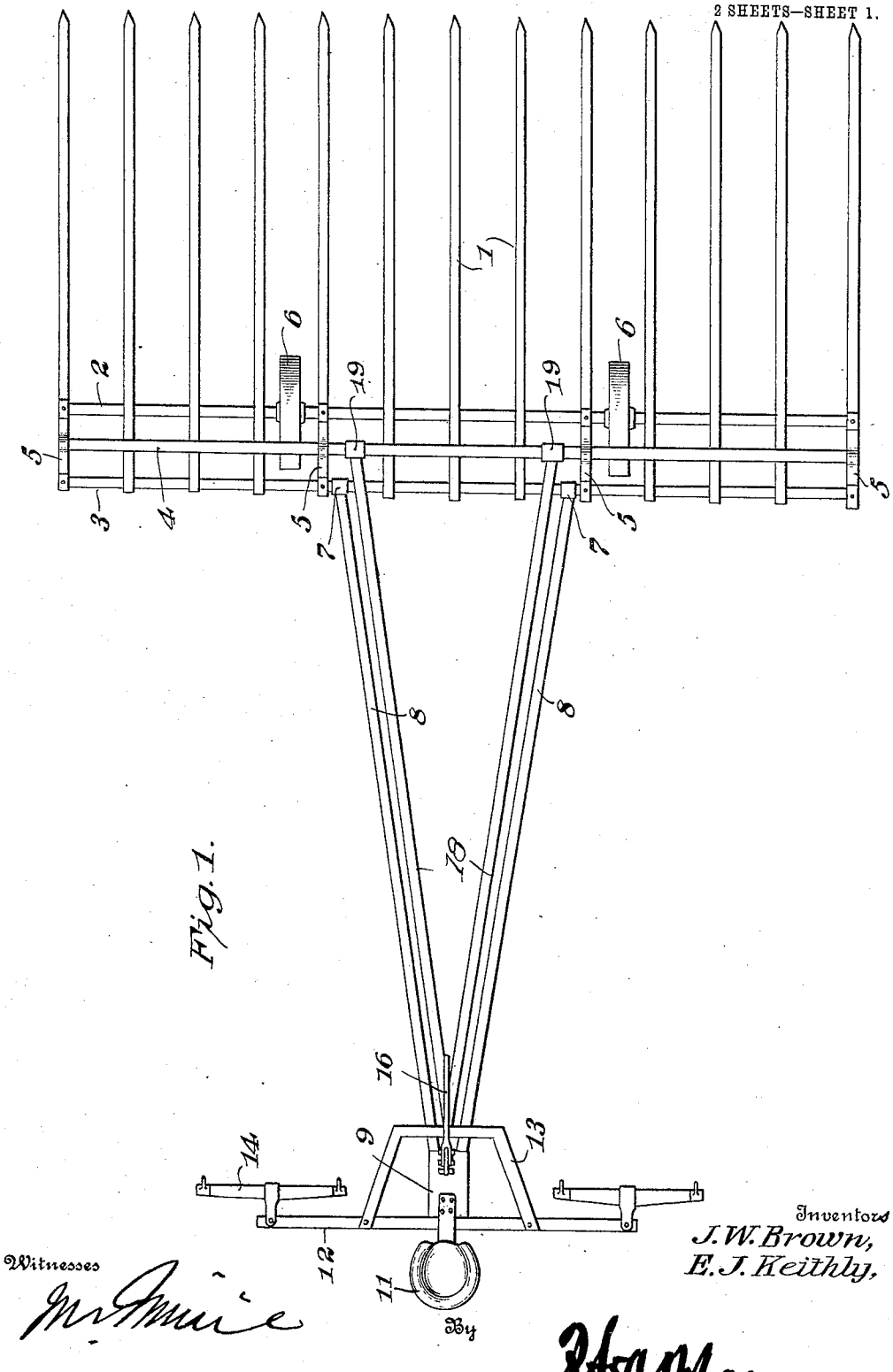

UNITED STATES PATENT OFFICE.

JOHN W. BROWN AND EDWARD J. KEITHLY, OF CEDAR VALE, KANSAS.

SWEEP-RAKE.

No. 931,675.  Specification of Letters Patent.  Patented Aug. 17, 1909.

Application filed February 4, 1909. Serial No. 476,103.

*To all whom it may concern:*

Be it known that we, JOHN W. BROWN and EDWARD J. KEITHLY, citizens of the United States, both residing at Cedar Vale, in the county of Chautauqua and State of Kansas, have invented certain new and useful Improvements in Sweep-Rakes, of which the following is a specification.

The present invention relates to certain new and useful improvements in hay forks, and the object of the invention is the provision of a device of this character embodying a novel construction whereby it can be used to an advantage for the transfer of loads over rough and uneven land, the load being lifted from eight to twelve inches from the ground as the operator desires.

The invention further contemplates a hay rake which is simple and inexpensive in its construction, and which is entirely under the control of the operator, the heaviest loads being readily raised and lowered with one hand, and the device being easily steered when drawn across a field.

For a full understanding of the invention and the merits thereof and also to acquire a knowledge of the details of construction and the means for effecting the result, reference is to be had to the following description and accompanying drawings, in which:

Figure 1 is a top plan view of a hay rake constructed in accordance with the invention; Fig. 2 is a side elevation, the fork being shown in a lowered position in full lines and in an elevated position in dotted lines; and Fig. 3 is a detail perspective view of the truck at the rear end of the reach members.

Corresponding and like parts are referred to in the following description and indicated in all the views of the drawings by the same reference characters.

Specifically describing the embodiment of the invention shown on the drawings, the numerals 1 designate the tines of the fork which may be of any desired number and are preferably formed of metal. The rear ends of the tines are secured to a rake head comprising the spaced transverse bars 2 and 3 to which the tines are directly connected, and a third transverse bar 4 which is supported by a series of brackets 5 projecting upwardly from the bars 2 and 3.

A pair of supporting wheels 6 are journaled upon the forward transverse bar 2 while the rear transverse bar 3 has a pair of sleeves 7 loosely fitted thereon. Secured to these sleeves 7 are the rearwardly converging reach members 8 the extremities of which are secured to a plate 9. This plate is supported by a caster wheel 10 which is loosely connected thereto to swing about a vertical axis. A seat 11 and draft beam 12 are secured to the plate 9, the draft beam being securely held against any swinging movement with respect to the plate or reach members by means of the braces 13, and the extremities of the draft beam being provided with the swingletrees 14 to which the horses are hitched, one of the horses being located upon each side of the reach members.

Projecting upwardly from the plate 9 is a bracket 15 and one end of a lever 16 is pivotally mounted upon this bracket. Particular attention is directed to the fact that the pivot end of the lever is curved and that the curved portion of the lever is connected to a curved arm 17 at the termination of rods 18, the free ends of the links being connected to sleeves 19 loosely mounted upon the upper transverse bar 4 of the rake head. The lever 16 is located in front of the seat 11 and by manipulating this lever the rake can be swung up and down about the upper transverse bar as an axis so as to either raise or lower the load thereon as desired. When the lever is swung rearwardly to the limit of its movement in that direction, the connection between the arm 17 at the termination of the rods 18 and the curved portion of the lever is shifted to the opposite side of the pivot center of the lever so that the load upon the fork locks the lever in the said position. However, when the lever is lifted the load may be depressed and held in the desired position.

Having thus described the invention, what is claimed as new is:

In a hay rake the combination of a plurality of tines, a plurality of transverse bars secured across the inner ends of said tines to support the same, a supporting bar mounted above said transverse bars, brackets carried by said transverse bars and engaged with said supporting bar, sleeves loosely disposed on said supporting bar in spaced relation thereon, rods rearwardly converged from said sleeves, the rear ends of said rods being integrally formed and curved downwardly, a curved hand-lever pivotally connected adjacent its lower end to the rear extremities of said rods, reaches rearwardly converged from said transverse bars, a plate formed at the rear of said reaches, a draft beam transversely positioned with respect to said plate, braces carried by said plate for supporting said draft beam, a bracket carried by said plate for supporting said lever, said lever being fulcrumed at its lower extremity to said bracket to dispose the point of pivotal connection of the same to the rear end of said rods below the pivotal point of said lever with said bracket when the lever is drawn back to lock said rods in adjusted position and means for supporting said braces and said transverse bars.

In testimony whereof we affix our signatures in presence of two witnesses.

JOHN W. BROWN. [L. S.]
EDWARD J. KEITHLY. [L. S.]

Witnesses:
LOCKE LEMERT,
L. M. CLAGET.